Patented Mar. 17, 1942

2,276,677

UNITED STATES PATENT OFFICE 2,276,677

THERAPEUTICALLY ACTIVE PREPARATION

Hermann Vollmer, New York, N. Y., assignor to Sharp & Dohme, Incorporated, Philadelphia, Pa., a corporation of Maryland No Drawing. Continuation of application Serial No. 299,973, October 18, 1939. This application April 8, 1941, Serial No. 387,445

6 Claims. (Cl. 167—67)

This invention covers preparations for the treatment of affections of the central nervous system and particularly for the treatment of chronic progressive diseases thereof such as Parkinson's disease, paralysis agitans or shaking palsy, which preparations comprise as their essential therapeutically effective ingredients a mixture of the three alkaloids hyoscyamine, atropine and scopolamine.

Parkinson's disease or paralysis agitans or shaking palsy has been considered one of the most distressing conditions physicians have had to deal with. Its miserable characterizations including, among others, muscular rigidity, weakness, slowness of movements, salivation and drooling, and rhythmic, spontaneous tremors, gradually becoming more and more incapacitating to the unfortunate victim, coupled with the ineffectiveness of methods and medication heretofore available, have made it one of the most hopeless of man's ills.

In the endeavor to reach some means of overcoming this aggravating situation, each of the alkaloids atropine, hyoscyamine, scopolamine or hyoscine, amphetamine sulfate, stramonium and others has been tried individually, but without indicating that encouragement might be found in their use. The disappointment following such separate use of the individual alkaloids particularly may be noted in relation to the dosages in which they have been tried as compared with the average doses required with a preparation according to the instant invention.

A suitable composition within the invention, the essential therapeutically effective alkaloids of which consist of about 90.2% hyoscyamine, 7.4% atropine and 2.4% scopolamine, produces consistent, striking improvement upon administration equivalent to average daily doses of 1.8–3.0 mg. total alkaloids, the maximum of which is equivalent to about 2.7 mg. hyoscyamine, 0.22 mg. atropine and 0.07 mg. scopolamine daily. It appears that when any one of the alkaloids, atropine, hyoscyamine, scopolamine or hyoscine, amphetamine sulfate, or stramonium, was administered alone in a total daily dose equivalent (as to each of the first three thereof) to the maximum amount of the same alkaloid included in the total daily dose of applicant's preparation (stramonium or any of the others considered in comparable dosage) or even in a total daily dose of 3.0 mg. or even more of the single alkaloid, the treatment was completely ineffective, or, at best, only slight and fleetingly temporary benefit was noted. However, at its best such treatment was found to be accompanied with markedly undesirable side effects which were particularly noted in the attempts to obtain more satisfactory results by administering high doses of the particular individual one of these alkaloids, which appear to have been tried, for example, in the case of atropine, in dosages from 5 to 40 times the maximum of the above noted average daily dose for the preparation of this invention.

Atropine has been reported as having been administered in doses of from 15 mg. up to as high as 120 mg. per day. The use of atropine by itself has been found not only to have a stimulant action upon the central nervous system leading to excitement and hallucination and to cause dilation of the pupils requiring wearing correcting glasses, but also, as discovered by post mortem examination of patients with Parkinsonism, who had received large doses of atropines for a long period, to cause atony or paralysis of the muscles of the gastro-intestinal tract with attendant dilation of the gastro-intestinal tract (mega colon formation) and inhibition of the gastro-intestinal secretion.

Hyoscyamine, similarly employed, caused the same dangerous symptoms as atropine. It produced a paralyzing effect on the autonomic nerve endings, together with dizziness and hallucinations.

With scopolamine or hyoscine, there was found the danger in the paralyzing action on the respiratory and circulatory centers, and depressing action on the central nervous system.

Stramonium in similar use has manifested like side effects including paralysis of accommodation and mental excitement.

Amphetamine sulfate overstimulated the nervous system and caused insomnia, dilation of the pupils, marked restlessness, hyperexcitability and inability to relax.

As indicated above, in the endeavor to obtain clinical results by the separate administration of any one of the individual alkaloids, abnormally high dosages were required (e. g., with atropine even up to 120 mg. per day instead of the normal maximum dose of 3 mg. per day). The distressing side effects and the severe toxic and sometimes fatal effects resulting from prolonged administration of these high doses of any one of the specific alkaloids prohibits their clinical use.

I have found that the above mentioned side effects are not noted if instead of administering solely any one of the individual alkaloids, there is employed the composition of this invention comprising the combination of the three alkaloids hyoscyamine, atropine and scopolamine.

The product of this invention is a stable, uniform, standardized preparation containing as its essential therapeutically active ingredients an assimilable form of each of the alkaloids hyoscyamine, atropine and scopolamine.

Any suitable assimilable form of these alkaloids may be employed in the invented preparation, for example, their salts with the mineral acids yielding, for example, the hydrobromide, hydrochloride, sulfate and the like, or salts with organic acids, for example, the tartrate, acetate, lactate and the like, so long as the alkaloids can be placed in solution. The alkaloids per se may be used in the composition.

The same soluble salt form of each alkaloid may be used in the mixture or one selected salt form of one and another selected salt form of the second and still another salt form of the third alkaloid.

A highly effective example, although the invention is not limited thereto, is the composition in which the mixture of alkaloids consists of:

|  | Per cent |
|---|---|
| Hyoscyamine hydrobromide | 90.2 |
| Atropine sulfate | 7.4 |
| Scopolamine hydrobromide | 2.4 |

The relationship of these specific alkaloids in compositions embraced by the invention may vary appreciably. Other suitable effective proportions are found, for example, within the respective ranges, although other proportions may show some utility:

Hyoscyamine___ From about 77.5 to about 95%
Atropine_____ From about 20 to about 1.5%
Scopolamine ___ From about 5 to about 0.5% the assimilable salts of all three alkaloids preferably being employed in the mixture. The essential requisite is to have all three alkaloids in the preparation. Thus it is seen that the assimilable salt of hyoscyamine is the major portion of the effective therapeutic ingredients of the compositions embraced by the invention, the atropine usually being the second more prominent of said ingredients and the scopolamine usually being present in the minimum amount of these three ingredients.

The preparation is produced by putting together the desired amount of the assimilable salts of the three alkaloids, which are available in a high degree of purity. In solid form, e. g. as a free running powder divided into dosages, as in powder papers or capsules, or particularly preferably as a tablet, the preparation is outstandingly useful. It contains the alkaloids (preferably as salts) in a high purity, in an exceedingly stable condition and regularly definitely standardized not only as to the total amount of alkaloids, but also as to the relative proportions of the individual alkaloids.

The tablet form permits accurate dosage not only when it is to be taken whole, but also, by virtue of the practice of slotting tablets, when it is to be taken as fractional tablets. The tablet preparation is strikingly beneficial particularly because it eliminates the possible dangers accompanying self-administration. This method of administration may be expected to be commonly found in the treatment of affections of the central nervous system such as Parkinson's disease, by virtue of the commonly experienced economic situation with such patients.

It is an essential part of the invention that the preparations covered by it include all three of the alkaloids hyoscyamine, atropine and scopolamine as the effective therapeutically active ingredients. However, while such preparations may consist solely of the three essential alkaloids in an assimilable form, compositions embraced by the invention may include along with the three alkaloids other accompanying ingredients not for the same purpose, such as diluents, excipients, binders, vehicles, and lubricating agents, and the like such as are employed for particular operative advantage in the production or for specific administration properties of the particular dosage form in which the preparation is to be marketed, or ingredients therapeutically effective for treating conditions other than those for which the preparation is primarily applicable, for example, a substance capable of introducing an acid (safe for internal use) to counteract gastric hypo-acidity, such as an organic acid as citric acid or an inorganic substance liberating a mineral acid in the stomach as ammonium chloride which breaks up into ammonia and hydrochloric acid, all of which ingredients, whether included for operative advantages or administration properties or for collateral treatment, may be broadly grouped and referred to as "accompanying additional ingredients."

The tablets covered by the invention may be illustrated by, but not restricted to, the following example for a 2½ grain tablet containing 0.5 mg. total alkaloid salts in which the individual alkaloids (calculated as bases) are present as 93.68 hyoscyamine, 4.12% atropine and 2.19% scopolamine:

Effective therapeutically active ingredients:

|  | Milligram |
|---|---|
| Hyoscyamine hydrobromide | 0.4507 |
| Atropine sulfate | 0.0372 |
| Scopolamine hydrobromide | 0.0119 |

Diluent, binder and excipient ingredients:

|  | Grains |
|---|---|
| Milk sugar | 1.28 |
| Sucrose | 0.49 |
| Starch | 0.39 |
| Acacia | 0.21 |
| Talc | 0.12 |
| Light mineral oil | Sufficient quantity |

Such tablet conveniently can be quarter slotted so that when necessary the treatment may be started with a very low dose which can be regularly increased till the optimum dose is reached.

With compositions of the preparation embraced by the invention, striking improvement is obtained from daily doses in which the total amount of alkaloids taken for the day varies with the individual patient from about 1.25 mg. to around 5.0 mg., although in some cases up to possibly 7.5 mg., but on the average from about 1.8 mg. to 3.0 mg. After sufficient medication, it is possible to discontinue administration of the preparation for a reasonable period without relapse to the original manifestations.

The surprisingly beneficial effects obtained with the preparations of the invention over the administration of any one of the individual alkaloids alone suggests that the highly desirable clinical results with the combination must follow from a pharmacodynamic potentiating action effective in the combination.

Following the use of the preparations of the invention, it has been found that insomnia, mental apprehension and spasticity and other manifestations of Parkinsonism or paralysis agitans are removed, that tremor has subsided to a remarkable degree, that muscle rigidity has been substantially lessened or eliminated with the result that many patients have been able to return to work and useful employment, and may have even become symptom-free.

While the invention has been described with respect to certain specific embodiments of it, it is understood that certain additions, modifications, substitutions and equivalents may be employed without departing from the spirit of the invention.

This application is a continuation of my co-pending application Serial No. 299,973, filed October 18, 1939.

I claim:

1. A therapeutically active, solid, uniform and stable preparation for the treatment of affections of the central nervous system, comprising the alkaloids hyoscyamine, atropine and scopolamine in assimilable stable form in such ratio that the hyoscyamine content of said preparation amounts to from 75.5 to 95.0 per cent, the atropine content to from 20.0 to 1.5 per cent, and the scopolamine content to from 5.0 to 0.5 per cent of the total alkaloid content of said preparation.

2. A therapeutically active, stable and uniform preparation suitable for the treatment of affections of the central nervous system, comprising soluble salts of the alkaloids hyoscyamine, atropine and scopolamine in such ratio that the hyoscyamine content of said preparation amounts to from 75.5 to 95.0 per cent, the atropine content to from 20.0 to 1.5 per cent, and the scopolamine content to from 5.0 to 0.5 per cent of the total alkaloid content of said preparation.

3. A therapeutically active, stable and uniform preparation comprising the alkaloid salts hyoscyamine hydrobromide, atropine sulphate and scopolamine hydrobromide in such ratio that the hyoscyamine content of said preparation amount to from 75.5 to 95.0 per cent, the atropine content to from 20.0 to 1.5 per cent, and the scopolamine content to from 5.0 to 0.5 per cent of the total alkaloid content of said preparation.

4. A therapeutically active, solid, uniform and stable preparation for the treatment of affections of the central nervous system, comprising the alkaloids hyoscyamine, atropine and scopolamine in assimilable stable form in such ratio that the hyoscyamine content of said preparation amounts to about 93.7 per cent, the atropine content to about 4.1 per cent, and the scopolamine content to about 2.2 per cent of the total alkaloid content of said preparation.

5. A therapeutically active, uniform preparation suitable for the treatment of affections of the central nervous system, comprising soluble salts of hyoscyamine, atropine and scopolamine in such ratio that the hyoscyamine content of said preparation amounts to about 93.7 per cent, the atropine content to about 4.1 per cent, and the scopolamine content to about 2.2 per cent of the total alkaloid content of said preparation.

6. A therapeutically active, stable and uniform preparation comprising the alkaloid salts hyoscyamine hydrobromide, atropine sulphate and scopolamine hydrobromide in such ratio that the hyoscyamine hydrobromide content of said preparation amounts to about 90.2 per cent, the atropine sulphate content to about 7.4 per cent, and the scopolamine hydrobromide content to about 2.4 per cent of the total alkaloid salt content of said preparation.

HERMANN VOLLMER.